US012794381B2

(12) United States Patent
Konstantinov

(10) Patent No.: US 12,794,381 B2
(45) Date of Patent: Nov. 10, 2026

(54) PIEZOELECTRIC COLLECTOR WITH CONTROLLABLE MECHANO-HYDRAULIC AMPLIFIER

(71) Applicant: Dragomir Konstantinov, Sofia (BG)

(72) Inventor: Dragomir Konstantinov, Sofia (BG)

( * ) Notice: Subject to any disclaimer, the term of this patent is extended or adjusted under 35 U.S.C. 154(b) by 901 days.

(21) Appl. No.: 18/246,576

(22) PCT Filed: Oct. 5, 2020

(86) PCT No.: PCT/BG2020/000035
§ 371 (c)(1),
(2) Date: Mar. 24, 2023

(87) PCT Pub. No.: WO2022/073081
PCT Pub. Date: Apr. 14, 2022

(65) Prior Publication Data
US 2023/0369995 A1 Nov. 16, 2023

(51) Int. Cl.
*H02N 2/18* (2006.01)

(52) U.S. Cl.
CPC .................................. *H02N 2/186* (2013.01)

(58) Field of Classification Search
CPC ................................ H02N 2/186; H02N 2/18
See application file for complete search history.

(56) References Cited

U.S. PATENT DOCUMENTS 3,354,327 A 11/1967 Benson
2008/0197635 A1* 8/2008 Torch ................. F03B 13/1815 290/53
2012/0119624 A1 5/2012 Vamvas
2022/0098744 A1* 3/2022 Mills ....................... H05H 1/01

FOREIGN PATENT DOCUMENTS

RU 2267866 C1 1/2006
RU 2379530 C1 1/2010
RU 134372 U1 11/2013

OTHER PUBLICATIONS

International Search Report and Written Opinion; PCT/BG2020/000035; Mailed Jun. 3, 2021.

* cited by examiner

*Primary Examiner* — Emily P Pham
(74) *Attorney, Agent, or Firm* — Dunlap Bennett & Ludwig PLLC

(57) ABSTRACT

The piezoelectric collector is used to collect and increase the pressure on the piezoelectric elements and the energy they produce. It consists of a frame (12), a primary piston (1) in contact with a source of variable pressure, the second end of which is located in a hollow hydraulic chamber (2), in which the first end of the secondary piston (3) is located, the other end is in contact with the press (4). The device includes one or more piezoelectric elements (8) connected to the electrical network (10), located in series, and the last piezoelectric element (8) is supported on the buffer (9). The device gives high energy efficiency, provided by the included mechanical-hydraulic reinforcement, as well as a multitude of piezoelectric elements activated simultaneously by variable external pressure.

2 Claims, 1 Drawing Sheet

PIEZOELECTRIC COLLECTOR WITH CONTROLLABLE MECHANO-HYDRAULIC AMPLIFIER

TECHNICAL FIELD

The device can be used to collect and controllable mechano-hydraulic amplify the pressure on piezoelectric elements, and of the energy generated by them, in conditions of variable external pressure.

STATE OF ART

Various piezoelectric measuring devices and energy collectors are known under conditions of variable pressure applied to them (for example, from pedestrian or vehicle traffic, from variable acoustic pressure, and others). All of them have the following characteristics: the amplitude of the force applied to their piezo elements is not multiplied; do not include mechanisms for controlled adjustment of the transfer coefficient of the applied force until reaching the piezoelectric elements; and each piezoelectric element responds individually to the application of force.

TECHNICAL ESSENCE OF THE INVENTION

The task of the present invention is to provide a piezoelectric device for collecting and controllable mechano-hydraulic amplification of pressure on piezoelectric elements, and of the energy generated by them, in conditions of variable external pressure.

The piezoelectric collector with a controlled mechanical-hydraulic amplifier consists of a frame, a hydraulic chamber, pistons and piezoelectric elements, the device includes:

- primary piston, the first end of which is in contact with the source of external variable pressure and is located outside the hydraulic chamber, and the second end is located in the hydraulic chamber;
- the hydraulic chamber is hollow and contains an incompressible fluid;
- the secondary piston is located in the hydraulic chamber in such a way that its first end is located inside the hydraulic chamber, and the second end in its final position protrudes from the hydraulic chamber and contacts the upper part of the press;
- one or more additional pistons are located in the hydraulic chamber, which are parallel to the secondary piston, the first end of each of the additional pistons is located in the cavity of the hydraulic chamber, and the second end of each of the additional pistons in its final position protrudes from the hydraulic chamber and contacts the upper part of the press;
- in additional pistons there are slots in which controlled locking teeth move;
- a group of one or more piezoelectric elements, while the piezoelectric elements are arranged in series one after the other, touching each other with their wide part;
- the lower side of the press is tightly pressed against the uppermost piezoelectric element of the group, and the last piezoelement of the group rests on the buffer;
- all piezoelectric elements are connected to the electrical network;
- hydraulic chamber, controlled locking teeth and buffer are located on the frame;
- in one embodiment, the device contains more than one group of piezoelectric elements; each group contains one or more piezoelectric elements, and the piezoelectric elements in each group are arranged one after the other, touching each other with their wide part; each group of piezoelectric elements interacts with the next group of piezoelements by a lever of the first kind or a lever of the second kind; while the fulcrum of each lever is located on the frame; the first arm of each lever touches the last piezoelectric element of the front group, and the second arm of each lever of the first kind/the first arm of each lever of the second kind touches the first piezoelectric element of the next group, except for the last group; the last piezo element of the last group touches the buffer; in addition, all piezoelectric elements are connected to the electrical network.

IMPLEMENTATION EXAMPLES

Figure 1:
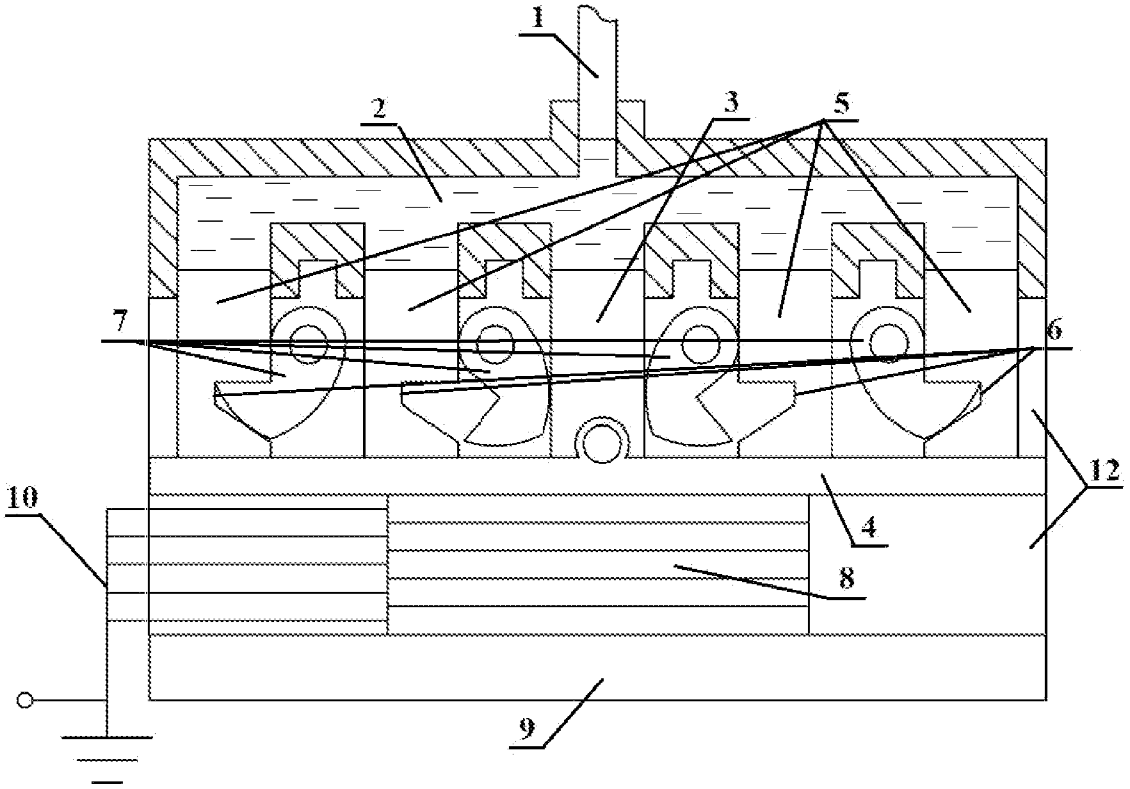
FIG. 1 shows a side view of a piezoelectric collector with controlled mechanical-hydraulic amplification and one group of piezoelectric elements.

FIG. 1 shows a variant of the device according to the present invention. The device consists of a primary piston (1), the first end of which is in contact with the source of external variable pressure and is located outside the hydraulic chamber (2), and the second end is in the hydraulic chamber (2). The secondary piston (3), connected to the press (4), exits the hydraulic chamber (2). More than one additional pistons (5) exit the hydraulic chamber (2) parallel to the secondary piston (3); all additional pistons (5) are tightly pressed against the press (4) and have slots (6) in which controlled locking teeth (7) move; the second side of the press (4) is tightly pressed against the first of a group of N piezoelectric elements (8) arranged in series, touching each other with its wide part; moreover, the last piezoelectric element (8) of the group touches the buffer (9), and all the piezoelectric elements (8) are connected to the electrical network (10); hydraulic chamber (2), controlled locking teeth (7) and buffer (9) are located on the frame (12).

When the device is in operation, the movement of part of the additional pistons (5) is prevented in advance by locking teeth (7) located in their slots (6) to regulate the expected pressure exerted on the piezoelectric elements (8) in accordance with their mechanical strength characteristics. When an external variable pressure is applied to the primary piston (1), it is transferred to the hydraulic chamber (2); from where this pressure is taken up by the secondary piston (3) and all additional pistons (5). According to Blaise Pascal's law of pressure transfer in an incompressible fluid, the individual transfer coefficient Kn between the external pressure Pin on the primary piston (1) and the pressure Pn-out on each piston (3) and (5) is directly proportional to the ratio between their area [1]; and the group transfer coefficient K1 between Pin on the primary piston (1) and pressure Pn-out on all pistons (3) and (5) is directly proportional to the sum of these ratios:

$$K1=\mathrm{SUM}(Pn\text{-out}/P\mathrm{in})=\mathrm{SUM}(Kn)=\mathrm{SUM}(Sn\text{-out}/S\mathrm{in}), \quad \text{A.}$$

where Pn-out is the pressure on the piston head (3) or (5), Sn-out is its area, Pin is the pressure of the primary piston (1), Sin is its area.

The pressure exerted on these of the additional pistons (5), the movement of which is blocked by the locking teeth (7), is transferred to the frame (12). The pressure on the secondary piston (3) and on these of the additional pistons (5), whose movement is not blocked by the locking teeth (7), is transferred to the press (4). The transfer coefficient K2 from the hydraulic chamber (2) to the press (4) is represented by the ratio of the free area to the area of all pistons (3) and (5), and since they all have the same area S-out, it is expressed by the formula $$K2=(M+1)/L,\ M\leq L, \qquad \text{B.}$$

where M is the number of free pistons (5), L is the number of all pistons (5), and 1 expresses the contribution of the secondary piston (3), which always transfers its pressure to the press (4).

The press (4) transfers the total pressure exerted on it to the first of the N piezoelectric elements (8) and then to the next, etc., pressing all the piezoelectric elements (8) against the buffer (9), which transfers this pressure to frame (12) as a consequence of conservation of momentum, according to the first law of Isaac Newton [2]. As a result, all piezoelectric elements (8) undergo reversible microscopic mechanical deformation, producing pulsed electrical energy, which they transmit to the electrical network (10)—a direct piezoelectric effect [3]. The coefficient K3 of this energy in relation to the energy produced by one piezoelectric element at the same pressure is equal to the number of piezoelements (8):

$$K3=N. \qquad \text{C.}$$

Thus, the overall device multiplier is:

$$K\ \text{general}=K1\times K2\times N. \qquad \text{D.}$$

This power generation process continues as long as the primary piston (1) remains under variable pressure.

Figure 2:
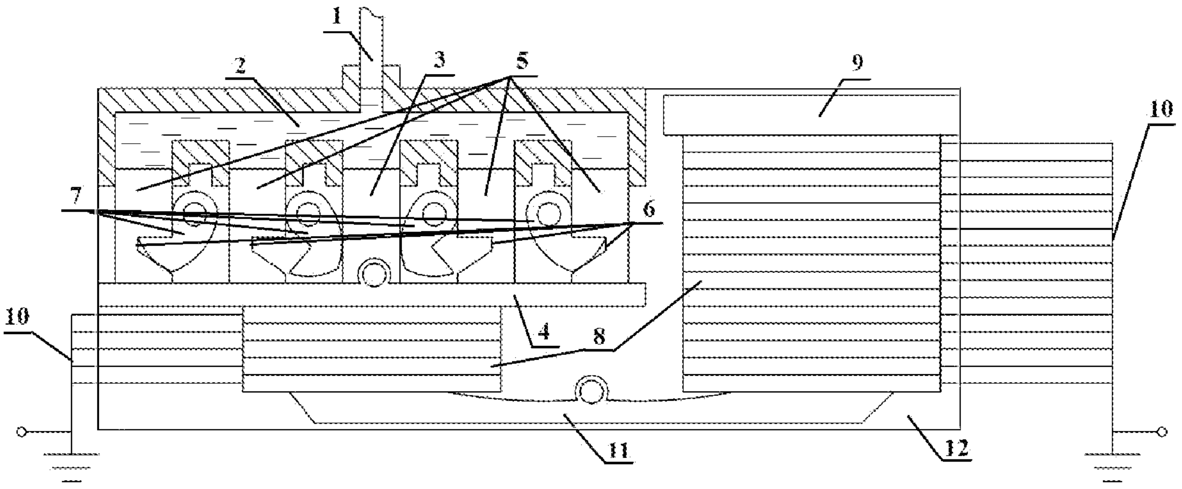
FIG. 2 shows a side view of a piezoelectric collector with controlled mechanical-hydraulic amplification, including a first-class lever and two groups of piezoelectric elements.

FIG. 2 shows another version of the device according to the present invention. The device consists of a primary piston (1), the first end of which is in contact with the source of external variable pressure and is located outside the hydraulic chamber (2), and the second end is in the hydraulic chamber (2). The secondary piston (3), connected to the press (4), exits the hydraulic chamber (2). More than one additional pistons (5) exit the hydraulic chamber (2) parallel to the secondary piston (3); all additional pistons (5) are tightly pressed against the press (4) and have slots (6) in which controlled locking teeth (7) move; the second side of the press (4) is tightly pressed against the first of a group of N piezoelectric elements (8) arranged in series, touching each other with its wide part; moreover, the last piezoelectric element (8) of the group touches the first arm of the lever of the first kind (11) located on the frame (12). The second arm of the lever (11) is equal in length to its first arm, and it is tightly pressed against the first piezoelectric element (8) from the second group containing N2 piezoelectric elements (8) arranged in series, touching their wide parts; the last piezoelectric element (8) of the second group is tightly pressed against the buffer (9), and all piezoelectric elements (8) are connected to the electrical network (10); hydraulic chamber (2), controlled locking teeth (7) and buffer (9) are located on the frame (12).

When the device is in operation, the movement of part of the additional pistons (5) is prevented in advance by locking teeth (7) located in their slots (6) to regulate the expected pressure exerted on the piezoelectric elements (8) in accordance with their mechanical strength characteristics. When an external variable pressure is applied to the primary piston (1), it is transferred to the hydraulic chamber (2); from where this pressure is taken up by the secondary piston (3) and all additional pistons (5). According to Blaise Pascal's law of pressure transfer in an incompressible fluid, the individual transfer coefficient Kn between the external pressure Pin on the primary piston (1) and the pressure Pn-out on each piston (3) and (5) is directly proportional to the ratio between their area [1]; and the group transfer coefficient K1 between Pin on the primary piston (1) and pressure Pn-out on all pistons (3) and (5) is directly proportional to the sum of these ratios:

$$K1=\text{SUM}(Pn\text{-out}/P\text{in})=\text{SUM}(Kn)=\text{SUM}(Sn\text{-out}/S\text{in}), \qquad \text{A.}$$

where Pn-out is the pressure on the piston head (3) or (5), Sn-out is its area, Pin is the pressure of the primary piston (1), Sin is its area.

The pressure exerted on these of the additional pistons (5), the movement of which is blocked by the locking teeth (7), is transferred to the frame (12). The pressure on the secondary piston (3) and on these of the additional pistons (5), whose movement is not blocked by the locking teeth (7), is transferred to the press (4). The transfer coefficient K2 from the hydraulic chamber (2) to the press (4) is represented by the ratio of the free area to the area of all pistons (3) and (5), and since they all have the same area S-out, is expressed by the formula $$K2=(M+1)/L,\ M\leq L, \qquad \text{B.}$$

where M is the number of free pistons (5), L is the number of all pistons (5), and 1 expresses the contribution of the secondary piston (3), which always transfers its pressure to the press (4).

The press (4) transfers the total pressure exerted on it to the first of the first group with N1 piezoelectric elements (8), and he to the next, etc., pressing all the piezoelectric elements (8) of the first group to the first arm of the lever (11); this causes pressure on the second arm of the lever (11) on the first of the second group with N2 piezoelectric elements (8), and he on the next, etc., pressing all the piezoelements (8) of the second group against the buffer (9), which transfers this pressure to frame (12) is a consequence of conservation of momentum, according to the first law of Isaac Newton [2]. As a result, all piezoelectric elements (8) undergo reversible microscopic mechanical deformation, producing pulsed electrical energy, which they transmit to the electrical network (10)—a direct piezoelectric effect [3]. The multiplication factor K3 of this energy relative to the energy produced by one piezoelectric element at a pressure equal to the pressure of the press (4) is equal to the sum of the number of piezoelectric elements (8) in the first group plus the number of piezoelectric elements (8) in the second group, multiplied by the lever effect V exerted by the lever (11), which in this case is equal to 1:

$$K3=N1+N2\times V. \qquad \text{C.}$$

Thus, the overall device multiplier in this variant is:

$$K\ \text{general}=K1\times K2\times(N1+N2\times V). \qquad \text{D.}$$

This power generation process continues as long as the primary piston (1) remains under variable pressure.

Application of the Invention

The invention can be used to collect and controllable mechanical-hydraulic increase in pressure on piezoelectric elements and the energy generated by them under conditions of variable external pressure. This provides high energy efficiency, provided by the included mechanical-hydraulic reinforcement, as well as by the multitude of piezoelectric elements activated simultaneously by the variable external pressure.

LIST OF DESIGNATIONS

1. Primary piston.
2. Hydraulic chamber.
3. Secondary piston.
4. Press.
5. Additional pistons.
6. Slots.
7. Managed locking teeth.
8. Piezoelectric elements.
9. Buffer.
10. Electrical network.
11. Lever.
12. Frame.

SOURCES

[1] Pascal's Principle—Definition, Example, and Facts, Encyclopedia Britannica, 2012; https://www.britannica-.com/science/Pascals-principle.

[2] Newton's Cradle, Harvard Natural Sciences Lecture Demonstrations, Harvard University, 2019; https://sciencedemonstrations.fas.harvard.edu/presentations/newtons-cradle; Illustrative example: https://en.wikipedia.org/wiki/Newton%27s_cradle#/media/File:Newtons_cradle_animation_book_2.gif

[3] Piezoelectricity, Encyclopedia Britannica; https://www.britannica.com/science/piezoelectricity.

The invention claimed is:

1. A piezoelectric collector with a controlled mechanical-hydraulic amplifier, consisting of a frame, a hydraulic chamber, a plurality of pistons, and a plurality of piezoelectric elements, comprising:

a primary piston, a first end of the primary piston is in contact with a source of external variable pressure and is located outside the hydraulic chamber, and a second end of the primary piston is located in the hydraulic chamber;

the hydraulic chamber is hollow and contains an incompressible fluid;

a secondary piston is located in the hydraulic chamber in such a way that its first end is located inside the hydraulic chamber, and a second end of the secondary piston in its final position protrudes from the hydraulic chamber and contacts an upper part of a press;

one or more additional pistons are located in the hydraulic chamber, which are parallel to the secondary piston, a first end of each of the one or more additional pistons is located in the cavity of the hydraulic chamber, and a second end of each of the one or more additional pistons in its final position protrudes from the hydraulic chamber and contacts the upper part of the press;

the one or more additional pistons having slots in which controlled locking teeth move;

a group of one or more piezoelectric elements, wherein the piezoelectric elements of the group are arranged in series one after the other, touching each other with their wide parts;

a lower side of the press is tightly pressed against an uppermost piezoelectric element of the group, and a last piezoelectric element of the group rests on a buffer;

all of the piezoelectric elements are connected to an electrical network;

the hydraulic chamber, the controlled locking teeth and the buffer are located on the frame.

2. The piezoelectric collector according to claim 1, wherein the piezoelectric collector contains more than one group of piezoelectric elements; each group contains one or more piezoelectric elements, and the piezoelectric elements in each group are arranged one after the other, touching each other with their wide parts; each group of piezoelectric elements 8 interacts with a next group of piezoelectric elements by a lever of a first kind or a lever of a second kind; while a fulcrum of each lever is located on the frame; a first arm of each lever of the first kind touches a last piezoelectric element of the front group, and a second arm of each lever of the first kind or the first arm of each lever of the second kind touches a first piezoelectric element of a next group, except for a last group; a last piezo element of the last group touches the buffer; and further wherein all piezoelectric elements are connected to the electrical network.

* * * * *